United States Patent [19]
Waite

[11] 3,893,226
[45] July 8, 1975

[54] METHOD OF MAKING SEMI-CONDUCTOR MOUNTS

[75] Inventor: John S. Waite, Barbicon near Welshpool, Wales

[73] Assignee: GKN Floform Limited, Welshpool, Wales

[22] Filed: Feb. 8, 1974

[21] Appl. No.: 440,801

Related U.S. Application Data

[63] Continuation of Ser. No. 279,867, Aug. 11, 1972, abandoned.

[52] U.S. Cl. .................... 228/170; 29/505; 29/581; 228/173; 228/193
[51] Int. Cl. ...................... B23k 31/02; B21d 31/00
[58] Field of Search ............ 29/588, 475, 589, 505, 29/506, 507, 508, 470.1, 590, 591, 581

[56] References Cited
UNITED STATES PATENTS

| | | | |
|---|---|---|---|
| 2,507,638 | 5/1950 | Leahy | 29/505 |
| 3,039,175 | 6/1962 | Dixon | 29/588 |
| 3,041,717 | 7/1962 | Brown | 29/505 X |
| 3,049,791 | 8/1962 | Shackman | 29/505 X |
| 3,176,382 | 4/1965 | Dickson | 29/588 |
| 3,197,843 | 8/1965 | Nippert | 29/581 |
| 3,242,555 | 3/1966 | Weber | 29/588 |
| 3,722,080 | 3/1973 | Sato | 29/581 |

*Primary Examiner*—Al Lawrence Smith
*Assistant Examiner*—Margaret M. Joyce
*Attorney, Agent, or Firm*—Owen, Wickersham & Erickson

[57] ABSTRACT

A method of making a solid state semi-conductor mount by pressing a copper blank and a steel mounting part for a cover together to cause plastic deformation of the copper blank and hence relative movement between the blank and surface of the mounting part so that the parts of the surfaces in contact are cleaned during the pressing operation and the desired external shape of the mount is produced. The assembly is then heated to cause the blank and the mounting part to bond together followed by mounting a semi-conductor on the body and securing a cover to the mounting part.

13 Claims, 6 Drawing Figures

PATENTED JUL 8 1975                      3,893,226

SHEET       1

3,893,226

METHOD OF MAKING SEMI-CONDUCTOR MOUNTS

This is a continuation of application Ser. No. 279,867 filed Aug. 11, 1972, now abandoned.

BACKGROUND OF THE INVENTION

1. Field of the Invention

This invention relates to a method of making a mount for a solid state semi-conductor.

2. Description of the Prior Art

A mount for a solid state semi-conductor is usually in one of two forms, namely a cup type mount or a stud type mount. A cup type mount may comprise a cup shaped body, made of copper or an alloy thereof, and having a mounting part in the form of a ring and usually made of steel, secured to the rim of the cup shaped body. An alternative form of cup type mount may comprise a disc shaped body, made of copper or an alloy thereof and having a mounting part in the form of an eyelet secured to the circumferential side wall of the body.

In both cases the mounting part is used for mounting a cover on the body after the semi-conductor has been mounted thereon.

A stud type mount comprises a body in the form of a shank, usually threaded, and usually made of copper or an alloy thereof and formed integrally with an enlarged head at one end upon which the semi-conductor may be mounted. A mounting part, usually of steel, is secured to the head, again for the mounting of a cover on the head after the semi-conductor has been mounted thereon.

Hitherto, such semi-conductor mounts have usually been made by positioning a mounting part on a blank of copper or an alloy thereof with a ring of brazing alloy interposed between the mounting part and the blank, followed by heating of the assembly to cause the brazing alloy to fuse and secure the mounting part to the body and then forming the body by forging the blank between press tools. Usually the blank has been preformed from stock bar or rod to a suitable shape for subsequent forging to make the body.

This method has the disadvantage that the brazing alloy, which is usually a silver brazing alloy, is relatively expensive. In addition, it is necessary to position the brazing alloy and mounting part on the blank and fuse the braze by passing the assembled components through a suitable furnace before forging of the blank to make the body and it is a time consuming and labour intensive operation, thereby increasing the cost of making the semi-conductor mount.

SUMMARY OF THE INVENTION

Accordingly, it is an object of the present invention to provide a new and improved method of making a solid state semi-conductor mount which avoids or reduces the above mentioned disadvantages of the existing method.

According to the invention, we provide a method of making a mount for a solid state semi-conductor comprising the steps of, positioning a blank adjacent a mounting part for a cover, applying pressure to said blank and mounting part to press them together and to cause plastic deformation of said blank and relative movement between the parts of the surfaces of the blank and mounting part which are in contact, followed by heating of said blank and mounting part thereon to cause bonding between said parts of said surfaces, mounting said semi-conductor on said body and mounting said cover on said mounting part.

The plastic deformation and relative movement causes a surface layer of the parts of the surfaces which are in contact to be removed to clean the surfaces so that bonding between the surfaces occurs as a result of diffusion of atoms between the surfaces, when the mount is heated.

The assembly operation required hitherto is thus eliminated being now combined with the manufacture of the component parts.

According to another aspect of the invention, we provide a solid state semi-conductor mount made in accordance with the method of the preceding paragraph.

BRIEF DESCRIPTION OF DRAWINGS

Three embodiments of s the present invention are described in more detail by way of example with reference to the accompanying drawings wherein.

DESCRIPTION OF THE PREFERRED EMBODIMENTS

Figure 1:
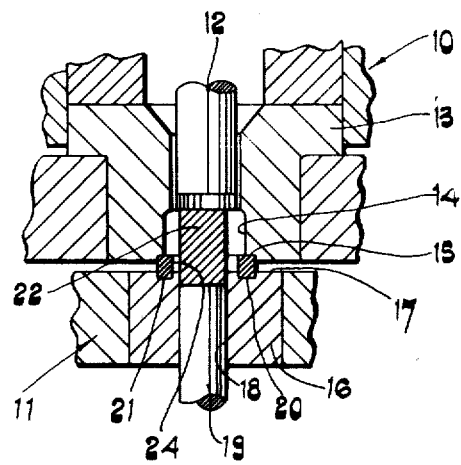
FIG. 1 is a fragmentary cross-sectional view through part of an apparatus for carrying out a method embodying the invention and showing the position of the apparatus immediately prior to the forging operation.

Referring to FIG. 1 of the accompanying drawings, a cup type solid state semi-conductor mount is made in a conventional forging press comprising an upper die assembly 10 and a lower die assembly 11. The upper die assembly 10 is provided with a slidable conventional ejector member 12 which is caused to move downwardly by conventional means, not shown, when it is desired to eject a completed mount from the apparatus.

The upper die assembly 10 comprises an upper die 13 having a generally cylindrical die recess 14 therein with a larger diameter portion 15 adjacent the open mouth of the die recess 14.

The lower die assembly 11 likewise carries a lower die 16 having a generally planar upper face 17 and a central passage 18 within which a fixed mandrel 19 is located the die assembly being supported by springs (not shown) and movable vertically relative to the mandrel. A stop (not shown) is provided to limit the extend of downwards movement of the die assembly 11 against the action of the springs. An annular recess 20, of channel cross-section, is formed in the upper surface 17 around the passage 18.

In use, a steel mounting part 21 in the form of a ring is fed by conventional mechanical feeding means, not shown, so that it is positioned in the recess 20 whilst a generally cylindrical blank 22 of copper or a copper base alloy is fed so as to be positioned on the lower die 16 within the mounting part 21.

Figure 2:
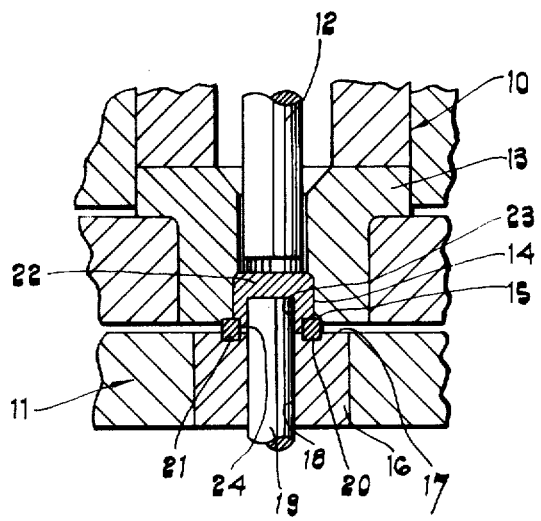
FIG. 2 is a view of the apparatus of FIG. 1 and showing the position of the apparatus at the end of the forging operation.

The upper die assembly 10 is then moved downwardly so that, as shown in FIG. 2, the blank 22 is acted upon by and is forged between, the dies 13 and 16, so that the mandrel 19 forms an axial recess 23 in the blank 22 whilst the lower part of the blank 22 is plastically deformed within the bore 24 of the mounting part 21 so that the part of the surface of the blank 22 which is in contact with the mounting part 21 is caused to move relative to the surface of the mounting part and because of the high pressure between the mounting part and the blank a surface layer is sheared from the bore 24 of the mounting part and the plastic deformation of the blank also causes removal of a surface layer from the part of the surface of the blank which contacts the mounting part.

The body and mounting part thereon are then removed from the press and is heated in a furnace having a hydrogen atmosphere at a suitable temperature and for a suitable time, for example 1000°C for 30 minutes, so that bonding occurs between the mounting part and the cup shaped body.

The bonding which occurs is diffusion bonding due to migration of atoms between the mounting part and the body, thereby creating the bond. It is essential for such bonding to occur that the contacting surfaces between which the atoms have to migrate are clean, and it is because of the plastic deformation of the blank, and hence of the relative movement between the blank and the mounting part and the high pressure that produces a shearing action to move the surface layer from the mounting part. The relative movement also tends to shear a surface layer from the copper blank and, in addition, because of the plastic deformation of the blank, new surfaces form on the copper blank which, is uncontaminated by oxide or other surface layer. The surfaces are maintained in close contact during the heating operation due to the differential thermal expansion of the steel and copper which can cause a radial pressure to be exerted on the contacting surfaces of the components when the components are heated.

After heating, the mount may be cold formed to the required final shape and this final cold forming also increases the hardness of the copper body due to work hardening.

Although a satisfactory bond has been obtained between a copper blank and a steel mounting part it is found that a better bond may be obtained if the steel mounting part is pre-plated with another metal such as copper, nickel or silver.

In order to achieve the maximum amount of relative movement between the articles during the application of pressure the shape of the articles may be adjusted. For example, the radius of the mouth of the bore 24 of the mounting part 21 into which the blank 22 is deformed may be increased so as to increase the area over which relative movement occurs.

Figure 3:
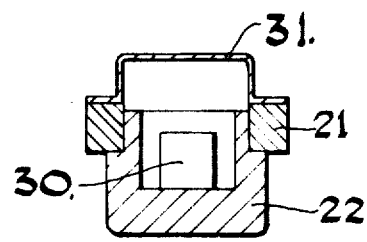
FIG. 3 is a cross sectional view through a mount made by the method described with reference to FIGS. 1 and 2.

A solid state semi-conductor 30 is then mounted on the body in conventional manner and a cover 31 is welded or otherwise secured to the mounting part in conventional manner as shown in FIG. 3.

Figure 4:
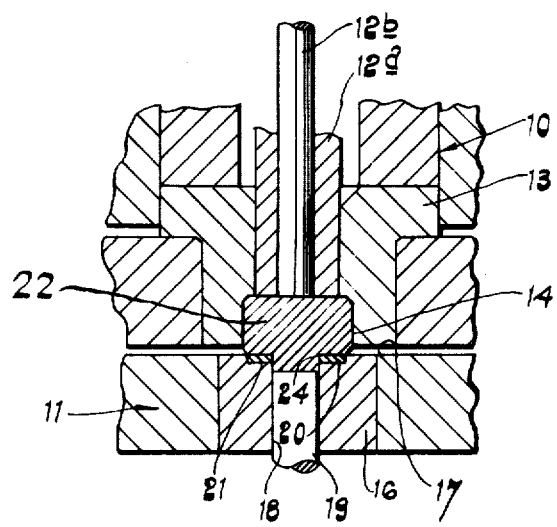
FIG. 4 is a fragmentary diagrammatic cross-sectional view through part of an apparatus used for carrying out a second embodiment of the invention showing the apparatus at the end of a forging operation.

In a second embodiment of the invention, illustrated diagrammatically in FIG. 4, a preform for a stud type mount is made.

The method and apparatus of the second embodiment are substantially the same as has been described previously in connection with the first embodiment, except for the shape of the dies 16 and 13, and the ejector 12 (*a*) and (*b*), which are modified as shown in FIG. 4.

Thus, as in the first embodiment, a cylindrical copper blank is fed so as to be positioned on the lower die 16 within the mounting part 21. The upper die assembly is then moved downwardly so that, as shown in FIG. 4, the blank 22 is acted upon by, and is forged between, the dies 13 and 16 so that the mandrel 19 co-operates with the surface 17 and weld ring 21 to form a stepped surface on the enlarged head of the preform, whilst the two-part ejector 12*a*, 12*b* forms the body of the preform.

Again plastic deformation of the blank occurs during the forging operation so that the part of the blank within the mounting part 21 is plastically deformed, whereby the part of the surface of the blank which is in contact with the mounting part 21 is caused to move relative to the surface of the mounting part, and because of the high pressure between the mounting part and the blank a surface layer is sheared from the bore 24 of the mounting part and the plastic deformation of the blank also causes removal of a surface layer of the part of the surface of the blank which contacts the mounting part.

The body and mounting part thereon are then removed from the press and heated as described in connection with the first example so that they are bonded together.

Figure 5:
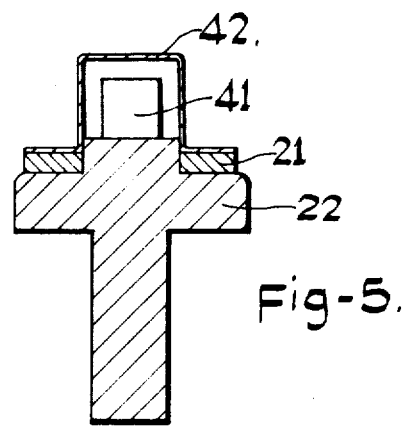
FIG. 5 is a cross-sectional view through a mount made by the method described with reference to FIG. 4.

After bonding has taken place the preform is extruded by means of suitable tools to give the configuration shown in FIG. 5. The work hardening which occurs during this deformation gives the mount the required strength.

When the mount has been made a solid state semiconductor 41 is mounted on the mount in conventional manner and a cover 42 is welded or otherwise secured to the mount part in conventional manner as shown in FIG. 5.

Figure 6:
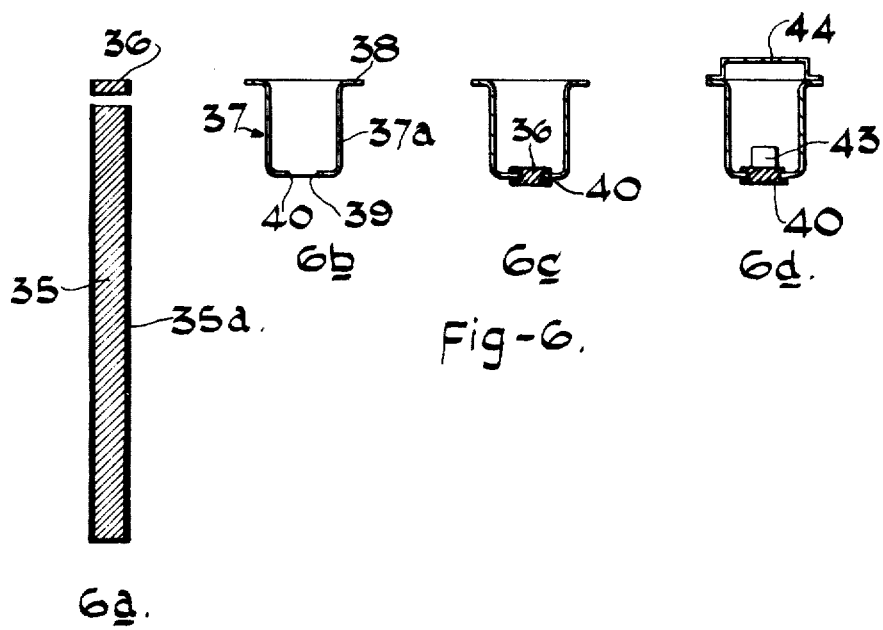
FIG. 6 illustrates diamgrammatically successive stages in a third embodiment of the invention.

In a third embodiment of the invention, illustrated diagrammatically in FIG. 6, an alternative form of cup type mount is made.

A rod of copper 35 is plated with silver 35*a* and a disc shaped blank 36 is cropped from the rod as shown in FIG. 6*a*.

A drawn steel eyelet 37 shown in FIG. 6*b* comprising a cylindrical part 37*a* having a radially outwardly extending flange 38 at one end and a radially inwardly extending flange 39 at the opposite end which defines a central aperture 40, is positioned in a press and the blank 36 is fed to lie within the aperture 40. The press is then operated so that the blank 36 is acted upon, and is forged between, dies so as to be deformed as shown in FIG. 6*c*.

Again plastic deformation of the blank 36 occurs during the forging operation so that the part of the blank within the aperture 38 of the mounting part is plastically deformed, whereby the part of the surface of the blank which is in contact with the mounting part 37 is caused to move relative to the surface of the mounting part and because of the high pressure between the mounting part and the blank a surface layer is sheared from the mounting part in the region of the aperture 40. The thus formed mount is then removed from the press and is heated in a furnace having a hydrogen atmosphere at about 800°C for 30 minutes. During the heating operation the silver plate diffuses into the copper and forms an alloy with the copper which metls and effects a brazed joint with the steel mounting part.

A solid state semi-conductor 43 is then mounted on the body in conventional manner and a cover 44 is welded or otherwise secured to the mounting part in conventional manner as shown in FIG. 6d.

I claim:

1. A method of making a mount for a solid state semiconductor comprising the steps of successively
   positioning a blank adjacent to and centrally aligned with the opening in an annular mounting part for a cover,
   applying pressure to the blank to cause plastic deformation of said blank to form said blank into a mount body of predetermined configuration, said deformation including radially outward movement of part of the blank to bring said blank into contact with a planar surface of the surrounding mounting part,
   continuing the pressure against said blank and exerting pressure against said mounting part, said pressure being sufficient to shear off surface portions of said blank and mounting part, thereby exposing new uncontaminated surfaces in contact with each other,
   then heating said body and mounting part while maintaining said contact to cause bonding between said new surfaces,
   then mounting said semiconductor on said body, and
   then mounting a cover on said mounting part.

2. A method according to claim 1 wherein said blank is made of a metal which is softer than the metal of which said mounting part is made.

3. A method according to claim 2 wherein said blank is made of a metal selected from the group comprising copper and a copper base alloy and said mounting part is made of a metal selected from the group comprising steel and another ferrous alloy.

4. A method according to claim 1 wherein said blank is forged to a desired external configuration during said application of pressure to said blank and mounting part.

5. A method of making a mount for a solid state semiconductor comprising the steps of successively:
   preplating an annular mounting part for a cover, to provide a plated surface,
   positioning a blank adjacent to and centrally within the plated annular mounting part,
   applying pressure to the blank to cause plastic deformation of said blank to form said blank into a mount body of predetermined configuration, said deformation including radially outward movement of part of the blank to bring said blank into contact with a planar plated surface of the surrounding mounting part,
   continuing the pressure against said blank and exerting pressure against said mounting part, said pressure being sufficient to shear off surface portions of said blank and outer surface portions of said plated surface on said mounting part, thereby exposing new uncontaminated surfaces in contact with each other,
   then heating said body and mounting part to cause bonding between the exposed new surfaces,
   then mounting said semiconductor on said body, and
   then mounting a cover on said mounting part.

6. A method according to claim 5 wherein said mounting part is steel and said plated surface is a metal selected from the group consisting of copper, nickel, and silver.

7. A method of making a mount for a solid state semiconductor comprising the steps of successively:
   preplating a blank with a metal which forms a relatively low temperature brazing alloy with the metal of said blank,
   positioning the plated blank adjacent to and centrally within an annular mounting part for a cover,
   applying pressure to the blank to cause plastic deformation of said blank to form said blank into a mount body of predetermined configuration, said deformation including radially outward movement thereof to bring said blank into contact with a planar surface of the surrounding mounting part,
   continuing the pressure against said blank and exerting pressure against said mounting part, said pressure being sufficient to shear off some outer surface portions of the plating on said blank and some surface portions of said mounting part, thereby exposing new uncontaminated surfaces in contact with each other,
   then heating said body and mounting part to cause bonding between the exposed new surfaces,
   then mounting said semiconductor on said body, and
   then mounting a cover on said mounting part.

8. A method according to claim 7 wherein said blank is made from copper or a copper base alloy and said plating is silver.

9. A method of making a mount for a solid state semiconductor comprising the steps of successively:
   plating a cylindrical copper rod with silver,
   slicing said rod to provide a disc-shaped blank having a cylindrical silver plate,
   positioning said blank adjacent to and centrally within the opening of an annular mounting part for a cover,
   applying pressure to the blank to cause plastic deformation of said blank including radially outward movement thereof to bring said blank into contact with a planar surface of the surrounding mounting part and the cylindrical surface of the opening therethrough,
   continuing the pressure against said blank and exerting pressure against said mounting part, said pressure being sufficient to shear off surface portions of said blank, including outer portions of said plate, and surface portions of said mounting part, thereby exposing new uncontaminated surfaces in contact with each other,
   then heating said blank and mounting part to cause bonding between exposed new surfaces,
   then mounting said semiconductor on said blank, and
   then mounting a cover on said mounting part.

10. A method of making a mount for a solid state semiconductor comprising the steps of successively
    shearing an elongated rod to provide a disc shaped blank,
    positioning said blank adjacent to and centrally aligned with the opening in an annular mounting part for a cover, applying pressure to the blank to cause plastic deformation of said blank including radially outward movement thereof to bring said blank into contact with a planar surface of the surrounding mounting part and the cylindrical surface of the opening therethrough, continuing the pressure against said blank and exerting pressure against said mounting part, said pressure being sufficient to shear off surface portions of said blank, and of said mounting part, thereby exposing new uncontaminated surfaces in contact with each other, then heating said blank and mounting part to cause bonding between the exposed new surfaces, then mounting said semiconductor on said blank, and then mounting a cover on said mounting part.

11. A method of making a mount for a solid state semiconductor comprising the steps of successively positioning a blank adjacent to and centrally aligned with the opening in an annular mounting part for a cover, applying pressure to the blank to cause plastic deformation of said blank to form said blank into a mount body of cup shape comprising a cylindrical part and a transversely extending end wall, said deformation including radially outward movement of part of the blank to bring a part of the blank adjacent the periphery of the open end of said cylindrical part into contact with a planar surface of the surrounding mounting part, continuing the pressure against said blank and exerting pressure against said mounting part, said pressure being sufficient to shear off surface portions of said blank and mounting part thereby exposing new uncontaminated surfaces in contact with each other, then heating said body and mounting part while maintaining said contact to cause bonding between said new surfaces, then mounting said semiconductor on said body, and then mounting a cover on said mounting part.

12. A method of making a mount for a solid state semiconductor comprising the steps of successively positioning a blank adjacent to and centrally aligned with the opening in an annular mounting part for a cover, applying pressure to the blank to cause plastic deformation of said blank to form said blank into a mount body of stud shape comprising a shank with an enlarged transversely extending head at one end, said deformation including radially outward movement of part of the blank to bring a transversely extending surface part of said head into contact with a planar surface of the surrounding mounting part, continuing the pressure against said blank and exerting pressure against said mounting part, said pressure being sufficient to shear off surface portions of said blank and mounting part, thereby exposing new uncontaminated surfaces in contact with each other, then heating said body and mounting part while maintaining said contact to cause bonding between said new surfaces, then mounting said semiconductor on said body, and then mounting a cover on said mounting part.

13. A method of making a mount for a solid state semiconductor comprising the steps of successively positioning a blank adjacent to and centrally aligned with the opening in an annular mounting part for a cover, applying pressure to the blank to cause plastic deformation of said blank to form said blank into a mount body of cylindrical shape with a circumferential channel section recess, said deformation including radially outward movement of part of the blank to bring surface portions of said recess into contact with a planar surface of a radially inwardly extending flange at one end of a cylindrical portion of a mounting part having a radially outwardly extending flange at the other end thereof, continuing the pressure against said blank and exerting pressure against said mounting part, said pressure being sufficient to shear off surface portions of said blank and mounting part, thereby exposing new uncontaminated surfaces in contact with each other, then heating said body and mounting part while maintaining said contact to cause bonding between said new surfaces, then mounting said semiconductor on said body and then mounting said cover on a mounting part.

* * * * *

UNITED STATES PATENT AND TRADEMARK OFFICE
CERTIFICATE OF CORRECTION

PATENT NO. : 3,893,226
DATED : July 8, 1975
INVENTOR(S) : John S. Waite

It is certified that error appears in the above–identified patent and that said Letters Patent are hereby corrected as shown below:

In the left-hand column of the first or cover page, insert the following between [21] and [52]:

--[30] Foreign Application Priority Data

March 6, 1970    Great Britain    10929/70--

Signed and Sealed this

Thirteenth Day of July 1976

[SEAL]

Attest:

RUTH C. MASON
*Attesting Officer*

C. MARSHALL DANN
*Commissioner of Patents and Trademarks*